Jan. 4, 1966 J. N. CUTRONE 3,226,885
SANDER ATTACHMENT FOR ELECTRIC MOTOR DRIVEN TOOLS
Filed Nov. 8, 1963 2 Sheets-Sheet 1
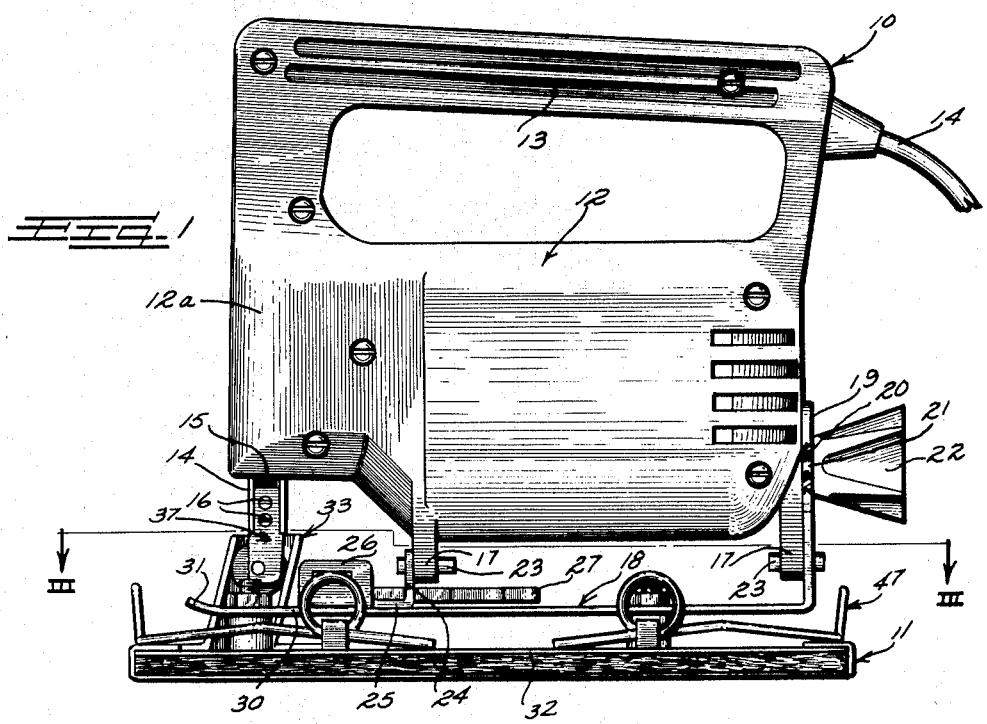
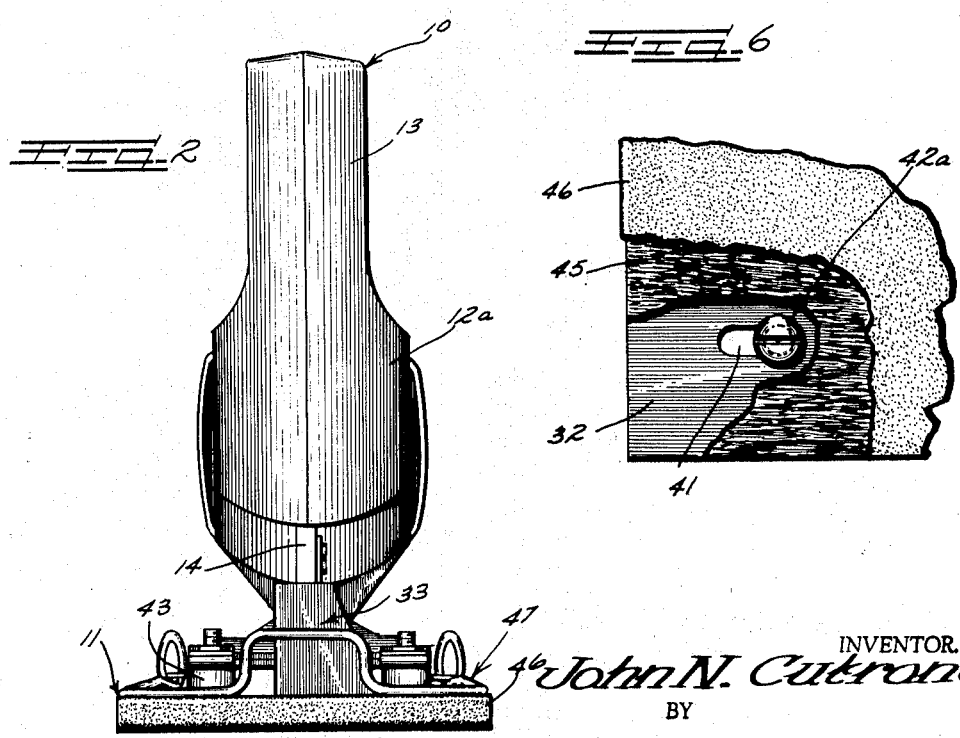
INVENTOR.
John N. Cutrone
BY
Hill, Sherman, Meroni, Gross & Simpson
ATTORNEYS Jan. 4, 1966 J. N. CUTRONE 3,226,885
SANDER ATTACHMENT FOR ELECTRIC MOTOR DRIVEN TOOLS
Filed Nov. 8, 1963 2 Sheets-Sheet 2
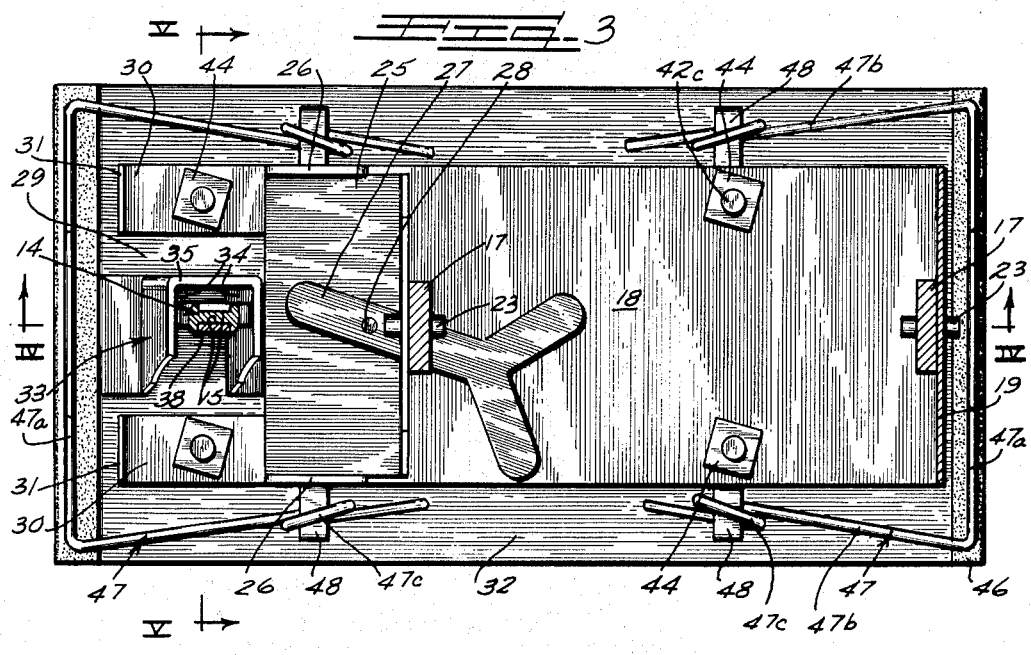
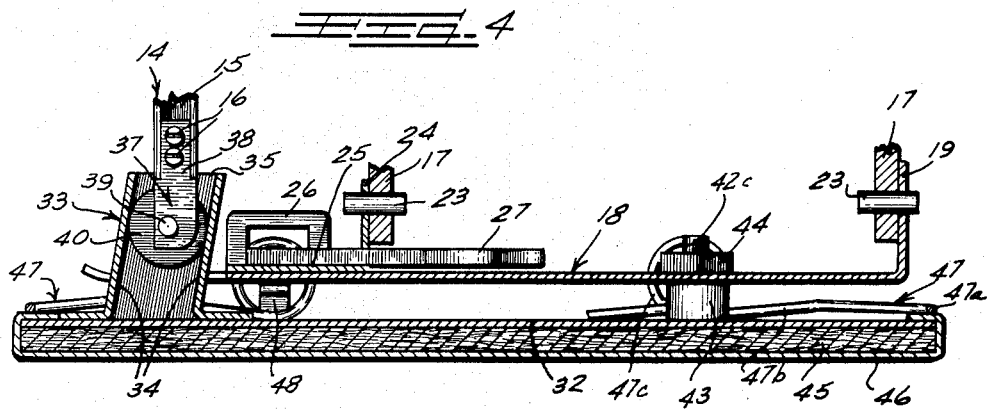
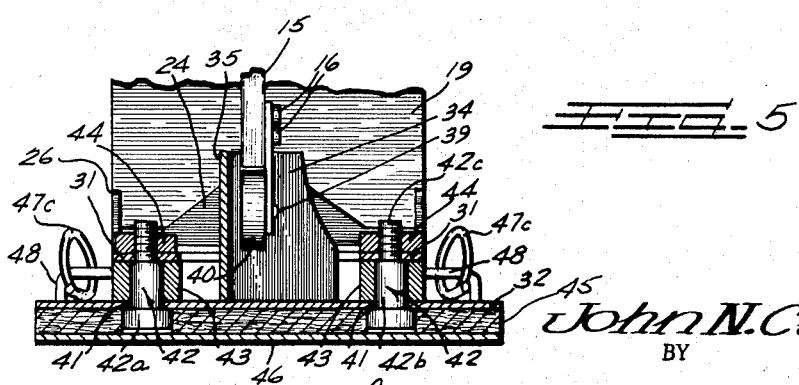
INVENTOR.
John N. Cutrone
BY
Hill, Sherman, Meroni, Gross & Simpson
ATTORNEYS

United States Patent Office 3,226,885
Patented Jan. 4, 1966

3,226,885
SANDER ATTACHMENT FOR ELECTRIC MOTOR
DRIVEN TOOLS
John N. Cutrone, Chicago, Ill., assignor to Ram Tool
Corporation, Chicago, Ill., a corporation of Illinois
Filed Nov. 8, 1963, Ser. No. 322,445
6 Claims. (Cl. 51—170)

This invention relates to a sander or rubbing machine attachment for portable power tools having other tool uses. Particularly this invention relates to a multipurpose electric motor driven tool having a sander attachment that is easily mounted on the tool to give rubbing machine operations at least equivalent to those obtained by a single purpose electric motor driven rubbing machine.

According to this invention an electric motor driven sabre saw is quickly converted to a sander or rubbing machine by simple addition of a roller attachment to the saw blade mounting and a cam track carrying base plate attachment to the base of the sabre saw tool for coacting with the roller to provide a reciprocating base for sand paper or rubbing material.

Accordingly it is an object of this invention to provide an attachment for a power tool which can quickly convert the tool into a rubbing machine or sander.

Another object of this invention is to provide an attachment for a standard power tool having a reciprocating head which transfers the reciprocating movement to a rubbing machine base.

Another object of this invention is to provide an attachment for a power driven sabre saw which converts the reciprocating saw mounting into a cam drive for a sander base plate.

A very specific object of this invention is to provide a mounting for the standard base of an electric motor driven sabre saw which is driven by the saw driving mechanism to impart a rubbing action to sand paper or the like carried by the attachment.

Other and further objects of this invention will be apparent to those skilled in this art from the following detailed description of the annexed sheets of drawings which, by way of a preferred example, illustrate one embodiment of the invention.

On the drawings:

FIGURE 1 is a side elevational view of an electric motor driven sabre saw with the sander attachment of this invention.

FIGURE 2 is a front elevational view of the assembly of FIG. 1.

FIGURE 3 is a plan view, with parts in horizontal section, taken substantially along the line III—III of FIG. 1.

FIGURE 4 is a longitudinal sectional view with parts in elevation taken substantially along the line IV—IV of FIG. 3.

FIGURE 5 is a transverse cross sectional view with parts in elevation, taken substantially along the line V—V of FIG. 3.

FIGURE 6 is a fragmentary bottom plan view of the attachment with parts broken away to show underlying parts.

As shown on the drawings:

In FIGS. 1 and 2 the reference numeral 10 designates generally an electric motor driven sabre saw tool having the attachment 11 of this invention mounted on the base thereof. The tool 10 includes a die cast housing 12 with a handle 13 on the top thereof. The housing 12 contains an electric motor receiving power from a cord 14 entering the handle. The motor drive mechanism (not shown) in the forward end or head 12a of the casing 12 reciprocates a tongue 14 extending from the bottom of the head 12a. This tongue has grooves 15 on opposite side faces thereof (see FIG. 3) and has several screws 16 threaded therein for attaching a sabre saw blade (not shown) thereto to be driven thereby.

The casing 12 has a pair of ears, including front and rear ears, 17 depending from the bottom thereof on which is pivoted the base plate 18 for the sabre saw tool. This base plate 18 has an upstanding rear end wall or flange 19 overlying the rear ear 17 at the rear of the casing 12 and an arcuate slot 20 in this rear wall receives a stud 21 projecting from the rear of the casing 12. A nut 22 is threaded on the stud 21 to clamp the rear flange 19 against the casing 12 and hold the base plate 18 in the desired angular position relative to the casing 12. As shown pivot pins 23 connect the base plate 18 with the ears 17 with one of these pins being connected to the rear flange 19 and the other pin connected to the upstanding rear flange 24 of a bracket 25 secured to the base plate 18 near the front end thereof. The two pivots 23 are aligned at the axial center of the plate 18 and the angular position of this plate relative to the casing or housing 12 is controlled by the nut 22 which clamps the rear wall 19 against the rear ear 17 at the rear of the casing or housing. If desired the rear flange 19 can be marked with indicia adjacent the slot 20 to indicate the degrees of tilting of the plate 18 relative to the casing.

The bracket 25 has upstanding slotted ears 26 at the ends thereof with the slots aligned and adapted to receive a guide bar (not shown) to gauge the position of the base plate 18 relative to an edge of the work or the like and a lock 27 pivoted at 28 on the bracket is effective to wedge against this guide bar (not shown) for holding the same against axial shifting in the ears 26.

The front end of the base plate 18 has a recess 29 bounded by side fingers 30 with upturned front ends 31. The sabre saw operates in the recess 29 and the fingers 30 serve as guides and supports on each side of the sabre saw blade.

According to this invention the base plate 18 need merely be provided with four bolt holes to mount the attachment 11 thereon, two of the holes being located near the rear of the plate and the other two being located in the fingers 30 of the plate.

The attachment 11 includes a metal plate 32 larger than the plate 18. The metal plate 32 has secured to the front end thereof a cam track forming bracket 33 which projects upwardly through the recess 29 in alignment with the tongue 14. This bracket 33 has front and rear upwardly and rearwardly inclined cam track walls 34 connected at one end by a web 35 to provide an upstanding U-shaped arrangement.

In accordance with this invention a cam roller assembly 37 is mounted on the tongue 14 in the same manner as the sabre saw blade would be mounted on the tongue. The cam roller assembly 37 includes a finger 38 fitting in one of the tongue grooves 15 and attached to the tongue by the screws 16 projected through holes in this finger. The finger 38 depends beneath the bottom of the tongue 15 and has a stud or pin 39 anchored near the bottom end thereof and extending under the tongue. A cam roller 40 is rotatably mounted on this lug 39 directly under the tongue 14 as best shown in FIGS. 4 and 5. The lug 39 provides an axle for the roller. The roller rides on the cam track provided by the walls 34 and as will be hereinafter described imparts a front to rear reciprocating motion to the plate 32 when the tongue 14 is vertically reciprocated.

The plate 32 has four slots 41 therethrough each of which are elongated in a front to rear direction as shown in FIG. 6 and receive a stud 42 therethrough. The studs have heads 42a best shown in FIG. 5 which underlie the slots 41, plain cylindrical shanks 42b which project freely through the slots 41 and reduced diameter threaded end portions 42c which project through the aforementioned four holes in the base plate 18. Cylindrical spacers 43 are positioned between plates 18 and 32 around the cylindrical portions 42b of the studs. Nuts 44 are threaded on the portions 42c of the studs over the base plate 18 or fingers 31 of the plate to thereby secure the plate 32 in spaced relation beneath the plate 18 while accommodating front and rear reciprocating movement of the plate 32 relative to the plate 18. Thus the stud shanks 42b by extending through the elongated slots 41, even though locked to the plate 18, will accommodate sliding movement of the plate 32.

The bottom face of the plate 32 has a felt pad 45 secured thereon to provide a resilient base for a sheet 46 of sand paper. The sand paper sheet is folded around the front and rear ends of the plate 32 and is retained on the plate by U-shaped springs 47 best shown in FIG. 3. These springs have a bight portion 47a for overlying and tightly engaging the folded over ends of the sand paper 46 together with side legs 47b with coiled portions 47c looped around ears 48 lanced from the plate 32. As shown in FIG. 5 these ears 48 have inturned fingers receiving the loops or coils 47c therethrough. To replace the sand paper it is only necessary to pry the bight portion 47a of the springs 47 off of the inturned ends of the sheet 46, place a new sheet under the felt 45, wrap the ends of the sheet over the front and rear edges of the plate 32 and insert the wrapped over ends under the spring portions 47a.

From the above description it will therefore be understood that the attachment of this invention is very easily applied to the standard base of an electric motor driven sabre saw and that the standard saw operating tongue easily receives the cam roller for driving the attachment. A standard sabre saw therefore, in accordance with this invention, may serve the dual function of a rubbing or sanding machine.

It will of course be appreciated that various mounting arrangements may be provided in place of the illustrated studs and spacers without departing from the principles of this invention.

I claim as my invention:

1. An attachment for an electric motor drive for a sabre saw having a base and a reciprocating saw blade driving tongue operating through the front end of the base which comprises a sand paper carrying base plate having an upstanding cam track, means for mounting the base plate under the base of the sabre saw accommodating horizontal reciprocating movement of the base plate relative to the base of the saw, and a cam roller attachment for the saw driving tongue operating in the cam track of the base plate for reciprocating the base plate to impart a rubbing action thereto.

2. A sander attachment for a power driven tool of the type having a reciprocating tongue and a guide base which comprises, a base plate, means for mounting the base plate under the guide base of the tool in spaced parallel relation therebeneath to accommodate front and rear reciprocating movement of the base plate, said base plate having an upstanding cam track adapted to receive the tongue of the tool therein, and a cam roller attachment for the tongue of the tool for riding on the cam track to reciprocate the base plate in a front to rear direction when the tongue is reciprocated in an up and down direction.

3. Attachment means for converting into a sander an electric motor drive for a sabre saw having a motor driven vertically reciprocating tongue and a base which comprises, a sander base, sandpaper retaining clips on the ends of said sander base, removable fasteners for mounting the sander base under the base of the drive, said fasteners accommodating vibration of the sander base relative to the base of the drive, a cam track on the sander base, and a cam driver riding said track adapted to be detachably mounted on the tongue of the drive for translating vertical reciprocation of the tongue into horizontal reciprocation of the sander base.

4. An attachment for an electric motor drive for a sabre saw having a horizontally disposed motor containing casing with an overlying handle, an underlying guide base and a vertically reciprocating front tongue, which comprises a sander base detachably mounted under the guide base for horizontal reciprocating movement relative to the guide base, an upstanding cam track on said sander base aligned with said tongue, and a cam attachment on said tongue to engage said cam track whereby vertical reciprocation of the tongue by the motor will be translated into horizontal reciprocation of the sander base by said cam attachment and cam track.

5. An attachment for an electric motor drive for a portable sabre saw having a casing housing, an electric motor in the housing, a handle overlying the casing, a head on the casing having a depending tongue driven by said motor in an up and down direction, a guide base under said casing and head pivoted thereto for tilting longitudinally to control the angle of the tongue relative to a workpiece on which the base is supported, and a lock nut assembly between the base and casing for fixing the position of the guide base, which comprises a rubbing machine base underlying the guide base, a plurality of detachable fasteners removably mounting the rubbing machine base on said guide base for horizontal vibratory movement relative to the guide base, detachable cam means on the tongue, coacting cam means on the rubbing machine base converting up and down movement of the tongue into horizontal vibration of the rubbing machine base, and means for mounting sandpaper on the rubbing machine base in underlying relation to the bottom face thereof.

6. In combination with an electric motor drive for a portable sabre saw having a vertically reciprocating motor driven tongue and a base for resting on a workpiece, a rubbing machine plate underlying said base having spring clips adapted to mount sheet material such as sandpaper under the plate, slots in said plate, bolts slidable in said slots, spacer sleeves on said bolts between the base and plate holding the plate in spaced parallel relation from the base, said base having holes receiving said bolts, nuts on the bolts overlying the base for securing the plate to the base, said slots accommodating horizontal reciprocation of the plate relative to the base, and cam means on the plate driven by the electric motor driven tongue for translating vertical reciprocation of the tongue into horizontal reciprocation of the plate.

References Cited by the Examiner
UNITED STATES PATENTS

| | | | |
|---|---|---|---|
| 1,295,359 | 2/1919 | Olson | 51—34.9 |
| 2,736,351 | 2/1956 | Baker | 144—35.1 X |
| 2,817,192 | 12/1957 | Amsden | 51—170.3 |
| 2,830,411 | 4/1958 | Hartmann | 51—170.3 |
| 2,873,561 | 2/1959 | Levine | 51—170.3 |
| 2,905,213 | 9/1959 | Levine | 51—170.3 |

ROBERT C. RIORDON, *Primary Examiner.*

J. SPENCER OVERHOLSER, LESTER M. SWINGLE,
*Examiners.*